United States Patent Office 3,127,390
Patented Mar. 31, 1964

3,127,390
AZO DYESTUFFS
Willy Mueller, Riehen, and Adolf Emil Siegrist, Basel, Switzerland, assignors to Ciba Limited, Basel, Switzerland, a company of Switzerland
No Drawing. Filed Mar. 10, 1961, Ser. No. 94,681
Claims priority, application Switzerland Mar. 15, 1960
6 Claims. (Cl. 260—152)

This invention provides a new azo-dyestuffs which are free from groups imparting solubility in water and correspond to the general formula 1) 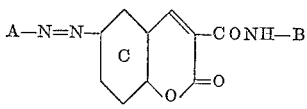

in which A and B each represent an aromatic radical which may be substituted, and the nucleus C may contain further substituents.

Of special interest are dyestuffs of the formula (2) 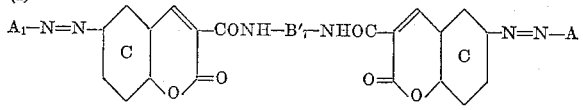

in which $A_1$, $R_2$ and $B'$ each represent an aromatic residue, and also those of the formula (3) 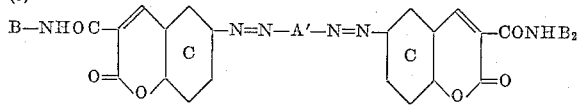

in which $A'$, $B_1$ and $B_2$ each represent an aromatic radical.

The invention also provides a process for the manufacture of the new dyestuffs of the above Formula 1, wherein an aromatic amine which is free from groups imparting solubility in water is condensed with a halide of a carboxylic acid of the formula (4) 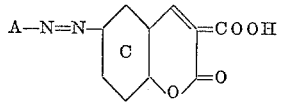

in which A represents an aromatic radical which may be substituted, and the nucleus C may contain further substituents.

The starting materials used in the process are free from groups imparting solubility in water, such as sulfonic acid, sulfonamide and carboxylic acid groups.

The dyestuffs of the Formula 2 are obtained by condensing 1 molecular proportion of an aromatic diamine free from groups imparting solubility in water with two molecular proportions of the same, or one molecular proportion each of 2 different, halide or halides of a monocarboxylic acid or acids of the formula (5) 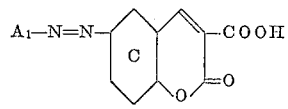

in which $A_1$ represents an aromatic radical, and the benzene nucleus C may contain further substituents not imparting solubility in water, the said halide or halides being free from groups imparting solubility in water. It is of advantage to condense two molecular proportions of a halide of the same carboxylic acid with one molecular proportion of the diamine.

The monocarboxylic acids of the Formula 4 or 5 are advantageously obtained by coupling a diazo-compound of an aromatic monamine free from groups imparting solubility in water with an alkali metal salt of a dicarboxylic acid of the formula (6) 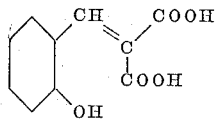

and lactonising the azo-dicarboxylic acid so obtained by heating it with an aqueous solution of a strong acid, for example, hydrochloric acid. The dicarboxylic acids of the Formula 6, which may contain further substituents not imparting solubility in water in the benzene nucleus, except in para-position to the hydroxyl group, such as halogen atoms or lower alkyl or alkoxy groups, can be obtained easily by heating coumarin-3-carboxylic acid in an aqueous alkaline solution. As examples of dicarboxylic acids of the Formula 6 there may be mentioned 2 - hydroxy-α-carboxy-cinnamic acid, 2-hydroxy-3-methoxy-α-carboxy-cinnamic acid and β - (1-hydroxynaphthyl-2)-α-carboxy acrylic acid As examples of diazo-components to be coupled with the dicarboxylic acids of the Formula 6 there may be mentioned aminonaphthalenes, for example, 1- or 2-aminonaphthalene, and especially aminobenzenes, such as aniline itself, nuclear halogenated anilines, for example, ortho-, para-, or meta-chloraniline, 2:5-dichloraniline, 3:4:5-trichloraniline, para-bromaniline, nitranilines, such as ortho-, para- or meta-nitraniline, alkoxyanilines, for example, ortho- or para-methoxy-aniline, nuclear alkylated anilines such as toluidines, meta-xylidine, halogen-alkyl-anilines, such as 3-trifluoromethyl-aniline or 3:5-di-(trifluoromethyl)-aniline, or phenyl-anilines, such as para-aminodiphenyl, or anilines containing functionally converted carboxyl groups, for example, carboxylic acid ester groups, cyano groups or carboxylic acid phenylamide groups Among this group of compounds there may be mentioned: aniline-3-carboxylic acid methyl ester, aniline-3:5-dicarboxylic acid dimethyl-ester, 3-cyanoaniline, 3- or 4-aniline carboxylic acid anilide. There may also be mentioned anilines containing different substituents, for example, 2 - chloro-5-methyl-aniline, 4-chloro-2-methyl-aniline, 2-methyl-5-chloraniline, 2-chloro-4-nitroaniline, 2-chloro-5-trifluormethylaniline, 2-nitro-4-chloraniline, 4-chloro-2-methoxyaniline, 2-chloro-4-methoxyaniline, 4-chloro-2-methoxy-5-methylaniline, 2-nitro-4-methylaniline, 4- or 5-nitro-2-methylaniline, 4-nitro-2-methoxyaniline, 4-chloro-2:5-dimethoxyaniline.

The acid halides can be made by treating the azo-carboxylic acids with acid-halogenating agents, more especially acid-chlorinating agents, for example, phosphorus trichloride or pentachloride, phosphorus hydroxychloride, and especially thionyl chloride.

The treatment with the aforesaid acid-halogenating agents is advantageously carried out in an inert organic solvent, such as dimethylformamide, chlorobenzenes, for example, mono- or di-chlorobenzene, toluene, xylene or nitrobenzene, and, in the case of the five solvents last mentioned, if desired, in the presence of dimethylformamide.

In preparing the carboxylic acid halides it is generally of advantage first to dry the azo-compounds that have been produced in an aqueous medium or to free them azeotropically from water by boiling in an organic solvent. The azeotropic drying may, if desired, immediately precede the treatment with the acid-halogenating agent.

In the process of the invention the monocarboxylic acid halides so obtained are condensed with aromatic, and at most bicyclic, diamines. As such diamines there may be mentioned more especially diaminobenzenes, and in particular those of the formula

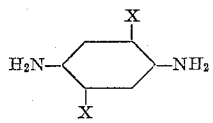

in which one X represents a halogen atom or a lower alkyl or alkoxy group, and the other X represents a hydrogen or halogen atom or a lower alkyl group or alkoxy group. As bicyclic diamines there may be mentioned diaminodiphenyls, diaminodiphenyl - alkanes, diaminodiphenylooxides, diaminodiphenyl sulfides and diaminodiphenylamines, for example, 1:4-diaminobenzene,
1:3-diaminobenzene,
1:3-diamino-4-methylbenzene,
1:3-diamino-4-methoxybenzene,
1:3-diamino-4-chlorobenzene,
1:4-diamino-2-chlorobenzene,
1:4-diamino-2-bromobenzene,
1:4-diamino-2:5-dichlorobenzene,
1:4-diamino-2-methylbenzene,
1:4-diamino-2:5-dimethylbenzene,
1:4-diamino-2-methoxybenzene,
1:4-diamino-2:5-dimethoxybenzene,
1:4-diamino-2:5-diethoxybenzene,
1:3-diamino-4:6-dimethylbenzene,
1:3-diamino-2:6-dimethylbenzene,
4:4'-diaminodiphenyl,
3:3'-dichloro-4:4'-diaminodiphenyl,
3:3'-dimethyl-4:4'-diaminodiphenyl,
3:3'-dimethoxy-4:4'-diaminodiphenyl,
3:3':5:5'-tetrachloro-4:4'-diaminodiphenyl,
3:3'-dichloro-5:5'-dimethyl-4:4'-diaminodiphenyl,
4:4'-diaminodiphenyl-methane,
4:4'-dimethoxy-3:3'-diaminodiphenyl-methane,
4:4'-diaminodiphenylamine,
4:4'-diaminodiphenyl oxide,
4:4'-diaminodiphenylene oxide,
4:4'-diaminodiphenylketone,
2:8-diaminochrysene,
4:11-diaminofluoranthene,
2:6- or 1:5-diaminonaphthalene, and
diaminobenzthiazoles such as 2-(4'-aminophenyl)-6-aminobenzthiazoles.

The condensation of the aforesaid carboxylic acid halides with the amines is advantageously carried out in an anhydrous medium. In such a medium the condensations generally take place surprisingly easily even at temperatures within the boiling range of the usual organic solvents, such as toluene, monochlorobenzene, dichlorobenzene, trichlorobenzene, nitrobenzene or the like. In order to accelerate the reaction it is generally desirable to use an acid-binding agent, such as anhydrous sodium acetate or pyridine. Some of the dyestuffs obtained are crystalline and others are amorphous, and they are generally obtained in very good yield and in a pure state. It is of advantage first to separate from the reaction mixture the acid chlorides obtained from the carboxylic acids. However, in some cases the isolation of the acid chloride can be dispensed with without harm, so that the condensation can be carried out with the carboxylic acid chloride in the reaction mixture in which it is produced.

The dyestuffs of the Formula 3 are obtained by condensing two molecular proportions of the same, or one molecular proportion each of two different, monamine(s) free from groups imparting solubility in water with halide(s) of dicarboxylic acid(s) of the formula (7)

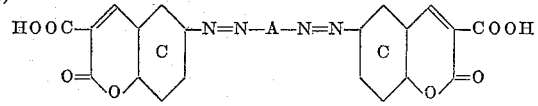

in which A represents an aromatic radical, and the benzene nucleus C may contain further substituents not imparting solubility in water.

The dicarboxylic acid of the Formula 7 can be obtained by coupling a tetrazo-compound of an aromatic diamine free from groups imparting solubility in water with 2 molecular proportions of an alkali metal salt of a dicarboxylic acid of the Formula 6, and lactonising the resulting azotetracarboxylic acid.

As examples of diamines to be coupled in the form of their tetrazo-compounds with dicarboxylic acids of the Formula 6, there may be mentioned more especially diaminodiphenyls, for example, 4:4'-diamino-1:1'-diphenyl, 4:4'-diamino-3:3'-dichlorodiphenyl, 4:4'-diamino-3:3'-dimethyl- or dimethoxydiphenyl. As further diamines there may be mentioned 4:4'-diaminodiphenyl-methane, 4:4'-diaminodiphenylamine and 4:4'-diaminodiphenyl oxide.

The preparation of the dicarboxylic acid halides of the azo-dicarboxylic acids is carried out in a manner analogous to that for preparing the monocarboxylic acids.

In the process of the invention one molecular proportion of a dicarboxylic acid halide so obtained is condensed with two molecular proportions of an aromatic and advantageously at most bicyclic, monamine free from groups imparting solubility in water. As examples there may be mentioned 1- and 2-aminonaphthalene, but more especially the mono-aminobenzenes mentioned above.

The condensation of the dicarboxylic acid halides with the monamines is carried out in a manner analogous to the condensation of the monocarboxylic acid halides with the diamines.

The new dyestuffs of the invention are valuable pigments which, owing to their insolubility in organic solvents and their resistance to heat, are very well suited for coloring plastic masses, especially polyvinyl compounds, in tints ranging from greenish-yellow to orange. They are distinguished by their good fastness to light and especially good fastness to migration. The dyestuffs are also useful in the so-called pigment printing method, that is to say, a printing method in which pigments are fixed on a substratum, especially on textile fibers, or on other flat structures, such as paper (for example, wallpaper) on fabrics of glass fibers, by means of an adhesive, such as casein, a hardenable synthetic resin, especially a urea- or melamine-formaldehyde condensation product, or a solution or emulsion of polyvinyl chloride or polyvinyl acetate or another emulsion, for example, an oil-in-water or water-in-oil emulsion. The pigments of the invention are also suitable, for example, in a finely divided form, for coloring artificial silk or viscose or cellulose ethers or esters or polyamides or polyurethanes in the spinning composition, and also for making colored lacquers or lacquer formers, solutions or products of acetyl-cellulose, nitro-cellulose, natural resins or synthetic resins, such as polymerisation or condensation resins, for example, aminoplasts, phenoplasts, polystyrene, polyethylene, polyacrylates, gums, casein, silicone resins. They can also be used with advantage in the manufacture of colored pencils, cosmetic preparations and laminated sheets.

Preparations, which contain the pigments in a finely divided form, can be made by methods in themselves known by intense mechanical treatment, for example, in roller mills or in suitable kneading apparatus. The choice of the medium serving as dispersion medium and in which the intense mechanical treatment is carried out depends on the porpose for which the preparations are intended, for example, for making preparations capable of dispersion in an aqueous medium sulfite cellulose waste liquor or salts of dinaphthyl-methane disulfonic acid are used, and for making spinning compositions to produce cellulose acetate artificial silk acetyl-cellulose mixed with a small amount of solvent is used.

By virtue of the especially favourable physical form in which the products of the invention are generally obtained, and owing to their chemical inertness and good heat resistance, they can easily be dispersed by the usual

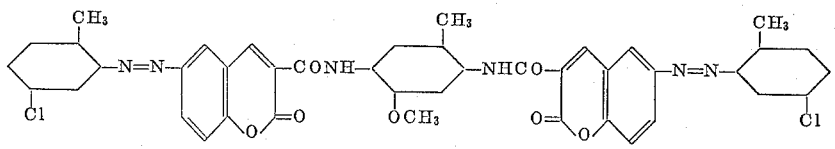

methods in compositions or preparations of the aforesaid kind, and this can be carried out with advantage at a stage in their manufacture preceding that in which the compositions or preparations have reached their final form. Accordingly, the operation necessary for shaping, such spinning, pressing, hardening, casting, sticking or the like can be carried out easily in the presence of the pigments, without any chemical reaction of the substratum, such as further polymerisation, condensation or the like, being inhibited.

The following examples illustrate the invention, the parts and percentages being by weight.

Example 1

40 parts of coumarine-3-carboxylic acid are hydrolysed in 250 parts of water with 90 parts of sodium hydroxide solution of 30% strength for 30 minutes at 90 to 95° C. The clear, yellow solution is then cooled to 20° C., and made up with ice and water to a volume of 600 parts and thereby adjusted to a temperature of 0° C. 60 parts of borax are added and the whole is coupled at 0 to 2° C. with a diazo solution prepared in the conventional manner from 28.3 parts of 4-chloro-2-aminotoluene. The mixture is stirred for 2 hours at room temperature; a thick, yellow-brown crystalline magma forms which is heated to 60° C., whereupon a yellow solution is obtained. This solution is treated with 100 parts of concentrated hydrochloric acid, whereupon the dyestuff acid precipitates as a thick, pale-beige paste. The whole is then heated for 10 to 15 minutes at 75 to 80° C., filtered, and the filter residue is washed with hot water until the filtrate runs neutral to Congo red and free from salt. After drying the filter residue, it forms 70 parts of a pale-yellow dyestuff acid.

72.3 parts of the resulting dyestuff acid are stirred in 500 parts of ortho-dichlorobenzene and the whole is heated to 85 to 90° C. In the course of 15 to 20 minutes 32.0 parts of thionylchloride are then added dropwise and the mixture is stirred and heated for 1½ hours at 95 to 100° C., during which the dyestuff acid dissolves, accompanied by a strong evolution of hydrochloric acid. The whole is allowed to cool to 20° C. while being stirred. The crystalline acid chloride is suctioned off, washed with dichlorobenzene and then with benzene and petroleum ether and dried in vacuo at 50 to 60° C.

In this manner there are obtained 65 parts of the dyestuff-carboxylic acid chloride of the formula

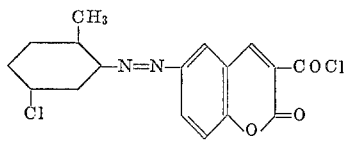

in the form of a yellow, crystalline powder melting at 232 to 234° C.

18.06 parts of the resulting acid chloride are stirred in 200 parts of ortho-dichlorobenzene and heated to 100 to 110° C. At this temperature a solution, heated to 110° C., of 3.8 parts of 2-methyl-5-methoxy-1:4-phenylene diamine, 0.5 part of pyridine and 50 parts of ortho-dichlorobenzene is added, the mixture is heated to 140 to 145° C. and stirred for 12 hours at the same temperature, then allowed to cool to 100° C., filtered, and the filter residue is rinsed with 300 parts of ortho-dichlorobenzene heated at 100° C., then rinsed with 100 parts of methanol and then with hot water. After drying, there are obtained 19 parts of a soft, orange-colored pigment of the formula

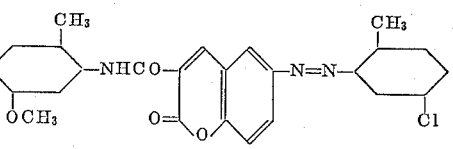

which produces in plastics, such as polyvinyl chloride, strong orange colorations having very good fastness to migration.

When an identical amount of acid chloride is condensed under identical conditions with 4.6 parts of benzidine, a yellow pigment results which colors polyvinyl chloride strong, reddish yellow shades.

The identical acid chloride yields on condensation with a corresponding amount of 2:5-dichloro-1:4-phenylenediamine a yellow pigment which colors plastics greenish yellow tints.

A number of pigments are shown in the following table which can be prepared as described in this example.

| Ex. No. | Coupling component | Diazo component | Condensation base | Shade in polyvinyl chloride |
|---|---|---|---|---|
| 1 | Coumarine-3-carboxylic acid | 3-nitro-4-aminotoluene. | 4:4'-diaminodiphenyl. | brown. |
| 2 | ----do------ | ----do------ | 3:3'-dichloro-4:4'-diaminodiphenyl. | yellow. |
| 3 | ----do------ | 2:4-dimethoxy-5-chloraniline. | 5-chloro-2-methyl-1:4-phenylenediamine. | Do. |
| 4 | ----do------ | ----do------ | 2:5-diethoxy-1:4-phenylenediamine. | reddish brown. |
| 5 | ----do------ | ----do------ | benzidine. | reddish yellow. |
| 6 | ----do------ | ----do------ | 3:3'-dichloro-4:4'-diaminodiphenyl. | pure yellow. |
| 7 | ----do------ | 4-chloro-2-amino-1-methoxybenzene. | 2:5-dichloro-1:4-phenylenediamine. | yellow orange. |
| 8 | ----do------ | ----do------ | 2:5-dimethyl-1:4-phenylenediamine. | orange. |
| 9 | ----do------ | ----do------ | benzidine. | reddish yellow. |
| 10 | ----do------ | ----do------ | 3:3'-dichloro-4:4'-diaminodiphenyl. | greenish yellow. |
| 11 | ----do------ | 4-methoxyaniline. | 2:5-dichloro-1:4-phenylenediamine. | very greenish yellow. |
| 12 | ----do------ | ----do------ | 2:5-dimethyl-1:4-phenylenediamine. | reddish yellow. |
| 13 | ----do------ | ----do------ | 3:3'-dimethyl-4:4'-diaminodiphenyl. | yellow. |
| 14 | ----do------ | ----do------ | 3:3'-dichloro-4:4'-diaminodiphenyl. | greenish yellow. |
| 15 | ----do------ | 2-amino-4-chlorodiphenyl ether. | 2:5-dichloro-1:4-phenylenediamine. | Do. |
| 16 | ----do------ | ----do------ | 2:5-dimethyl-1:4-phenylenediamine. | reddish yellow. |
| 17 | ----do------ | ----do------ | 5-chloro-2-methyl-1:4-phenylenediamine. | yellow. |
| 18 | ----do------ | ----do------ | 3:3'-dichloro-4:4'-diaminodiphenyl. | greenish yellow. |
| 19 | ----do------ | 5-methyl-4-chloro-2-methoxy-1-aminobenzene. | 2:5-dichloro-1:4-phenylenediamine. | reddish yellow. |
| 20 | ----do------ | ----do------ | 2:5-dimethyl-1:4-phenylenediamine. | Do. |
| 21 | ----do------ | ----do------ | 5-chloro-2-methyl-1:4-phenylenediamine. | Do. |
| 22 | ----do------ | ----do------ | 3:3'-dichloro-4:4' diaminodiphenyl. | Do. |
| 23 | ----do------ | 2:5-dimethoxy-4-chloro-1-aminobenzene. | 2:5-dimethyl-1:4-phenylenediamine. | Do. |
| 24 | ----do------ | ----do------ | benzidine. | Do. |
| 25 | ----do------ | ----do------ | 5-chloro-2-methyl-1:4-phenylenediamine. | yellow. |

| Ex. No. | Coupling component | Diazo component | Condensation base | Shade in polyvinyl chloride |
|---|---|---|---|---|
| 26 | Coumarine-3-carboxylic acid | 2:5-dimethoxy-4-chloro-1-aminobenzene. | 2:5-diethoxy-1:4-phenylenediamine. | brown. |
| 27 | ___do___ | 1-aminonaphthalene. | benzidine | greenish yellow. |
| 28 | ___do___ | ___do___ | 3:3'-dichloro-4:4'-diaminodiphenyl. | Do. |
| 29 | ___do___ | ___do___ | 2:5-dichloro-1:4-phenylenediamine. | yellow. |
| 30 | ___do___ | 2:5-diethoxy-4-benzoylamino-1-aminobenzene. | 2:5-dimethyl-1:4-phenylenediamine. | brown. |

*Example 31*

80 parts of coumarine-3-carboxylic acid are hydrolysed in 600 parts of water with 180 parts of sodium hydroxide solution of 30% strength for about ½ hour at 90 to 95° C. The clear solution is made up with ice and water to a volume of 1400 parts and adjusted to 0° C. 150 parts of borax are then added, and the mixture is coupled at 0 to 2° C. with a solution of 51 parts of tetrazotised 3:3'-dichloro-4:4'-diaminodiphenyl. The pH is maintained at 11 to 12 by adding dropwise another 50 parts of sodium hydroxide solution of 30% strength. The red-violet dyestuff solution is stirred overnight at room temperature, and then treated with 200 parts of concentrated hydrochloric acid. The yellow precipitate displays a distinctly acid reaction to Congo red. The whole is heated for 1 hour at 75 to 80° C., filtered, and the filter residue is washed with hot water until it is neutral and free from salt. After drying in vacuo at 90 to 100° C. there are obtained 131 parts of the dyestuff acid of the formula

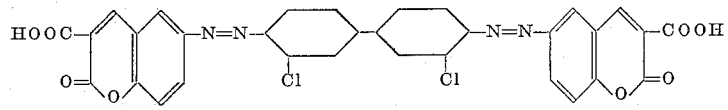

131 parts of the dyestuff acid obtained as described above are stirred in 1000 parts of ortho-dichlorobenzene at 100° C., 5 parts of dimethylformamide are added, and in the course of 15 minutes 64 parts of thionylchloride are added dropwise. The whole is stirred for 1 hour at 100 to 110° C., then allowed to cool to 40° C., and the crystalline acid chloride is filtered off, washed with 50 parts of ortho-dichlorobenzene and rinsed with benzene and petroleum ether. After drying in vacuo at 50 to 60° C., there are obtained 130 parts of the acid chloride in the form of small yellow needles.

14 parts of the acid chloride obtained as described above are stirred at 100° C. in 200 parts of ortho-dichlorobenzene, and a solution, heated at 100° C., of 4.65 parts of aniline in 50 parts of ortho-dichlorobenzene is added. The mixture is stirred for 8 hours at 145 to 150° C., then allowed to cool to 100° C., filtered, and the filter residue is washed with hot dichlorobenzene until the filtrate runs colorless; the dichlorobnezene is then washed out with methanol, and the filter residue is finally washed twice more with hot water and dried. A yellow, soft pigment is obtained which produces on incorporation in plastics, such as polyvinyl chloride, yellow shades having very good fastness to migration.

Pigments having similar properties are obtained when in the above example aniline is replaced by an equivalent quantity of 5-chloro-2-methylaniline or 6-chloro-2-methylaniline or 2-methoxyaniline.

When in the above example there is used as tetrazo component instead of 3:3'-dichloro-4:4'-diaminodiphenyl either benzidine or 3:3'-dimethyl-4:4'-diaminodiphenyl, similar pigments result which produce reddish yellow to orange colorations.

*Example 32*

22 parts of 8-methoxycoumarine-3-carboxylic acid are hydrolysed in 250 parts of water with 45 parts of sodium hydroxide solution of 30% strength for 30 minutes at 90 to 95° C. The clear, yellow solution is made up with ice and water to a volume of 400 parts and adjusted to 0° C., and then coupled at 0 to 2° C. with a diazo solution of 15.75 parts of 5-chloro-2-methoxyaniline. The resulting yellow-orange solution is stirred for 2 hours at room temperature and then treated with 50 parts of concentrated hydrochloric acid of 30% strength, whereupon the dyestuff acid precipitates in the form of a brownish yellow, thick crystalline magma. The whole is heated for 30 minutes at 75 to 80° C., filtered and the filter residue is washed with hot water until it is neutral and free from acid. After drying there are obtained 37 parts of the dyestuff acid of the formula

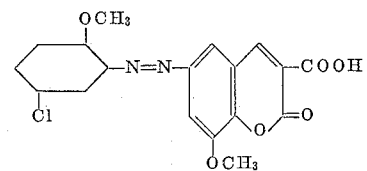

37 parts of the resulting dyestuff acid are heated in 400 parts of ortho-dichlorobenzene to 70 to 80° C., and in the course of 15 minutes 20 parts of thionylchloride are added dropwise. The mixture is stirred for 1 hour at 95 to 100° C., whereupon a clear, yellow solution forms. On cooling, the acid chloride is obtained in yellow crystals which are suctioned off, washed with a small amount of dichlorobenzene and then rinsed with benzene and petroleum ether. After drying, there are obtained 35 parts of the acid chloride which melts at 229 to 230° C.

14.2 parts of the above acid chloride are heated in 200 parts of ortho-dichlorobenzene to 110° C., and a solution heated at 110° C., of 2.8 parts of 2-methyl-5-chloro-1:4-phenylenediamine and 0.2 part of pyridine in 50 parts of ortho-dichlorobenzene is stirred in. The mixture is heated for 12 hours at 145 to 150° C., then allowed to cool to 100° C., filtered, and the filter residue is washed with hot dichlorobenzene until the filtrate runs colorless. The filter residue is then washed with methanol and finally with hot water. After drying there are obtained 16 parts of a soft, yellow pigment which colors polyvinyl chloride yellow shades of excellent fastness to migration.

When in this example there is used as condensation base 2:5-diethoxy-1:4-phenylenediamine instead of 2-methyl-5-chloro-1:4-phenylenediamine, a red-brown dyestuff results.

With benzidine as condensation base an olive-brown pigment is obtained, and with 2:5-dimethyl-1:4-phenylenediamine a yellow-brown pigment.

*Example 33*

A mixture of 65 parts of polyvinyl chloride, 35 parts of dioctylphthalate and 0.2 part of the dyestuff obtained as described in paragraph 2 of Example 1 is stirred and then rolled to and fro on a two-roll calender for 7 minutes at 140° C. A foil of orange color is obtained which possesses very good fastness to light and migration.

What is claimed is:

1. An azo-dyestuff selected from the group consisting of dyes of the formulae

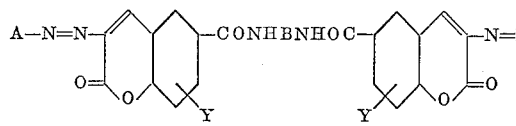

and

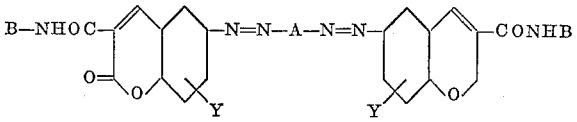

in which formulae A and B represent mono- to bi-cyclic aryl radicals and substituents on the radicals A and B are selected from the group consisting of hydrogen, chlorine, bromine, nitro, lower alkyl and alkoxy phenoxy and benzoylamino, and Y is a member selected from the group consisting of hydrogen, halogen, lower alkyl and alkoxy groups.

2. The dyestuff of the formula

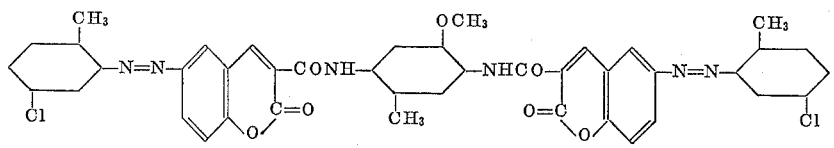

3. The dyestuff of the formula

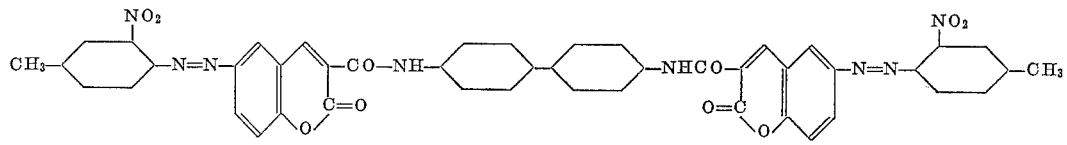

4. The dyestuff of the formula

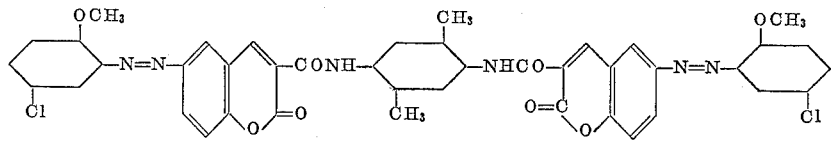

5. The dyestuff of the formula

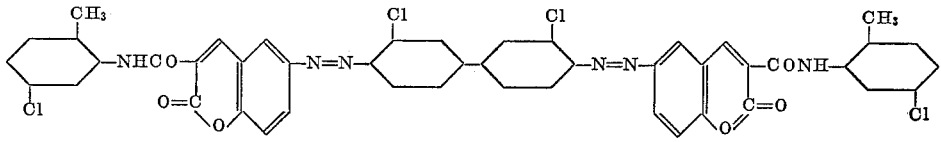

6. The dyestuff of the formula

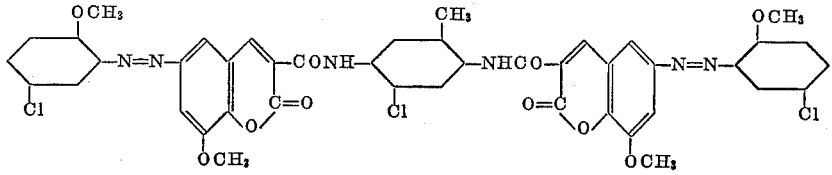

No references cited.

UNITED STATES PATENT OFFICE
CERTIFICATE OF CORRECTION

Patent No. 3,127,390                      March 31, 1964

Willy Mueller et al.

It is hereby certified that error appears in the above numbered patent requiring correction and that the said Letters Patent should read as corrected below.

Column 1, lines 22 to 26, the formula should appear as shown below instead of as in the patent:

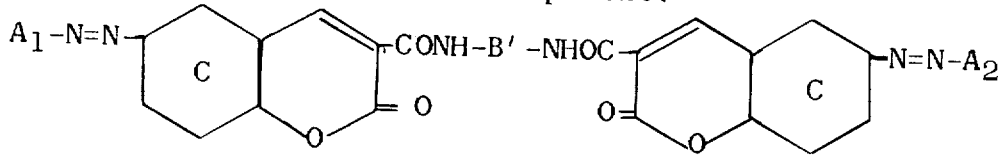

line 28, for "$R^2$" read -- $A^2$ --; same column 1, lines 41 to 46, the formula should appear as shown below instead of as in the patent:

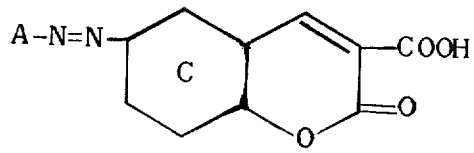

column 2, line 38, for "groups Among" read -- groups. Among --; column 4, line 67, for "porpose" read -- purpose --; column 9, lines 9 to 14, the right-hand portion of the formula should appear as shown below instead of as in the patent:

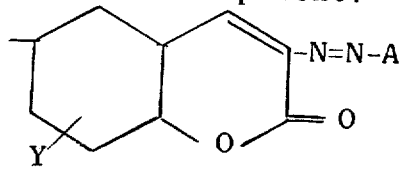

column 10, lines 2 to 6, the right-hand portion of the formula should appear as shown below instead of as in the patent:

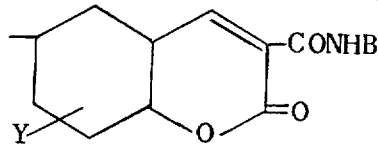

Signed and sealed this 4th day of August 1964.

(SEAL)
Attest:

ERNEST W. SWIDER
Attesting Officer

EDWARD J. BRENNER
Commissioner of Patents